(12) United States Patent
Akcasu et al.

(10) Patent No.: US 9,052,387 B2
(45) Date of Patent: Jun. 9, 2015

(54) TAMPER RESISTANT TRANSPONDER WITH SATELLITE LINK FOR AIRPLANE AND SHIP SAFETY

(71) Applicant: Lonestar Inventions, L.P., Morgan Hill, CA (US)

(72) Inventors: Osman Ersed Akcasu, Morgan Hill, CA (US); Jacqueline Mahan Akcasu, Morgan Hill, CA (US)

(73) Assignee: LONESTAR INVENTIONS, L.P., Morgan Hill, CA (US)

( * ) Notice: Subject to any disclaimer, the term of this patent is extended or adjusted under 35 U.S.C. 154(b) by 0 days.

(21) Appl. No.: 14/258,483

(22) Filed: Apr. 22, 2014

(65) Prior Publication Data

US 2014/0225769 A1 Aug. 14, 2014

Related U.S. Application Data

(63) Continuation-in-part of application No. 13/705,708, filed on Dec. 5, 2012, now Pat. No. 8,774,752.

(60) Provisional application No. 61/570,580, filed on Dec. 14, 2011.

(51) Int. Cl.
| | |
|---|---|
| *H04M 11/04* | (2006.01) |
| *G01S 19/03* | (2010.01) |
| *H04W 4/02* | (2009.01) |
| *H04W 4/04* | (2009.01) |
| *H04W 12/12* | (2009.01) |

(52) U.S. Cl.
CPC ............... *G01S 19/03* (2013.01); *H04W 4/028* (2013.01); *H04W 4/046* (2013.01); *H04W 12/12* (2013.01)

(58) Field of Classification Search
CPC ..... H04W 4/021; H04W 4/023; H04W 4/025; H04W 4/026; H04W 4/028; H04W 4/04; H04W 4/046; H04W 12/12
USPC ................ 455/430, 431, 456.1, 456.6, 404.1, 455/404.2
See application file for complete search history.

(56) References Cited

U.S. PATENT DOCUMENTS

| | | | | |
|---|---|---|---|---|
| 6,137,433 | A * | 10/2000 | Zavorotny et al. | 342/26 B |
| 6,683,867 | B1 * | 1/2004 | DeWulf | 370/350 |
| 7,280,825 | B2 * | 10/2007 | Keen et al. | 455/431 |

(Continued)

OTHER PUBLICATIONS

Non-Final Office Action of Jan. 16, 2014 for U.S. Appl. No. 13/705,708, 8 pages.

(Continued)

*Primary Examiner* — Jean Gelin
(74) *Attorney, Agent, or Firm* — Kilpatrick Townsend & Stockton LLP; Kenneth R. Allen (57) ABSTRACT

A tamper-resistant transponder system for craft is provided that inhibits attempted disablement and promotes very fast search and rescue operations for airplane and ship disasters. A key point in this invention is to have several simple transponders located on different places in the plane or a ship which can't be disabled by any means by any one or a number of people. The information which is transmitted periodically to a monitoring station through the satellite link are the GPS coordinates, date, time, altitude, speed and heading. In additions, the information may include the count of active transponders in the craft to be used to check against the number of monitored transponders. This information is the necessary and sufficient data to initiate a fast search and rescue operation anywhere in the world.

9 Claims, 3 Drawing Sheets

(56) References Cited

U.S. PATENT DOCUMENTS

| | | | |
|---|---|---|---|
| 8,694,181 B2* | 4/2014 | Horner et al. | 701/3 |
| 8,774,752 B1 | 7/2014 | Akcasu et al. | |
| 2006/0287822 A1* | 12/2006 | Twitchell et al. | 701/213 |
| 2007/0001898 A1* | 1/2007 | Twitchell et al. | 342/357.02 |
| 2007/0004331 A1* | 1/2007 | Twitchell et al. | 455/1 |
| 2008/0045250 A1 | 2/2008 | Hwang | |
| 2008/0081646 A1 | 4/2008 | Morin et al. | |
| 2008/0227430 A1 | 9/2008 | Polk | |
| 2010/0019967 A1* | 1/2010 | Farrokhi et al. | 342/357.09 |
| 2010/0075628 A1 | 3/2010 | Ye | |
| 2011/0217947 A1 | 9/2011 | Czaja et al. | |
| 2012/0007750 A1* | 1/2012 | Gorabi et al. | 340/984 |
| 2012/0252420 A1 | 10/2012 | Czaja et al. | |
| 2012/0282887 A1 | 11/2012 | Khoo et al. | |
| 2013/0109342 A1 | 5/2013 | Welch | |
| 2013/0295883 A1 | 11/2013 | Wesby-Van Swaay | |
| 2013/0324158 A1* | 12/2013 | Deng et al. | 455/456.1 |
| 2013/0344841 A1 | 12/2013 | Daly | |

OTHER PUBLICATIONS

Notice of Allowance of Apr. 29, 2014 for U.S. Appl. No. 13/705,708, 8 pages.

* cited by examiner

TAMPER RESISTANT TRANSPONDER WITH SATELLITE LINK FOR AIRPLANE AND SHIP SAFETY

CROSS-REFERENCES TO RELATED APPLICATIONS

The present application claims partial benefit of U.S. application Ser. No. 13/705,708, filed Dec. 5, 2012, entitled "Method for Emergency Alert Using SMS Text," Inventors, O. E. Akcasu and I. Akcay, which in turn claims benefit under 35 USC 119(e) of U.S. provisional Application No. 61/570,580, filed on Dec. 14, 2011, entitled "Method for Emergency Alert Using SMS Text," the contents of which are incorporated herein by reference in their entirety.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

This invention relates to messaging systems and in particular to use as a transponder.

This application is an extension of concepts disclosed in the patent application "Method for Emergency Alert Using SMS Text", O. E. Akcasu and I. Akcay, U.S. application Ser. No. 13/705,708, filed Dec. 5, 2012. Therein, it was disclosed how to automatically communicate location information from a simple transmitting device with messaging capabilities. A conventional transponder has very a small but very important amount of navigation data that is transmitted to a base station through a satellite link periodically, often every minute to several minutes, depending on the speed of motion of the aircraft or ship. If it is accidentally or deliberately turned off, then that navigation data is not accessible outside of the craft.

What is needed is an arrangement that can defeat or otherwise inhibit attempts to hide high-value assets.

The following references provide supplemental and background information for this invention.
1. "Global Positioning System, Theory and Practice," B. Hofmann-Wellenhof, H. Lichtenegger and J. Collins, Copyright 1992, 1993, 1994, 1997 and 2001, Springer Wien New York, 5th Edition, ISBN 3-211-83534-2.
2. "Astronomical Algorithms," Jean Meeus, Second Edition ISBN-10: 0943396352, Copyright 1991, Willmann-Bell, Inc.
3. "Solar Timer Using GPS Technology," O. E. Akcasu, I. Akcay, U.S. Patent Publication 2013/0116967 A1, May 9, 2013.
4. "Method for Emergency Alert Using SMS Text," O. E. Akcasu and I. Akcay, U.S. patent application Ser. No. 13/705,708, filing date Dec. 5, 2012.
5. "Engineering Electromagnetic Fields and Waves," Carl T. A. Johnk, John Willey & Sons, Copyright 1975, ISBN 0-471-44289-5.
6. "Elements of Electromagnetics," Matthew N. O. Sadiku, Oxford University Press, Copyright 2001 Third Edition, 2001, ISBN 0-19-513477-X.
7. James P. Mitchell, "Aircraft Satellite Communication System for Distributing Internet Service from Direct Broadcast Satellites," U.S. Pat. No. 6,529,706 B1, Mar. 4 2003.

SUMMARY

According to the invention, a tamper-resistant transponder system for craft is provided that inhibits attempted disablement and promotes very fast search and rescue operations for airplane and ship disasters. A key point in this invention is to have several simple transponders located on different places in the plane or a ship which can't be disabled by any means by any one or a number of people. The information which is transmitted periodically to a monitoring station through the satellite link are the GPS coordinates, date, time, altitude, speed and heading. In additions, the information may include the count of active transponders in the craft to be used to check against the number of monitored transponders. This information is the necessary and sufficient data to initiate a fast search and rescue operation anywhere in the world. Such an arrangement can eliminate the problems related to locating planes in incidents such as the loss of Air France Flight AF447 Rio-Paris of 1 Jun. 2009 and the Malaysian Air MH370 Kuala Lumpur-Beijing disappearance of 7 Mar. 2014. Furthermore, in hijacking incidents, including four cases of Sep. 11, 2001, the transponders of the hijacked planes were turned off by the hijackers and this by itself created a serious issue in locating the hijacked aircraft. This invention also provides a solution to this type of tampering

DETAILED DESCRIPTION OF SPECIFIC EMBODIMENTS

Figure 1:
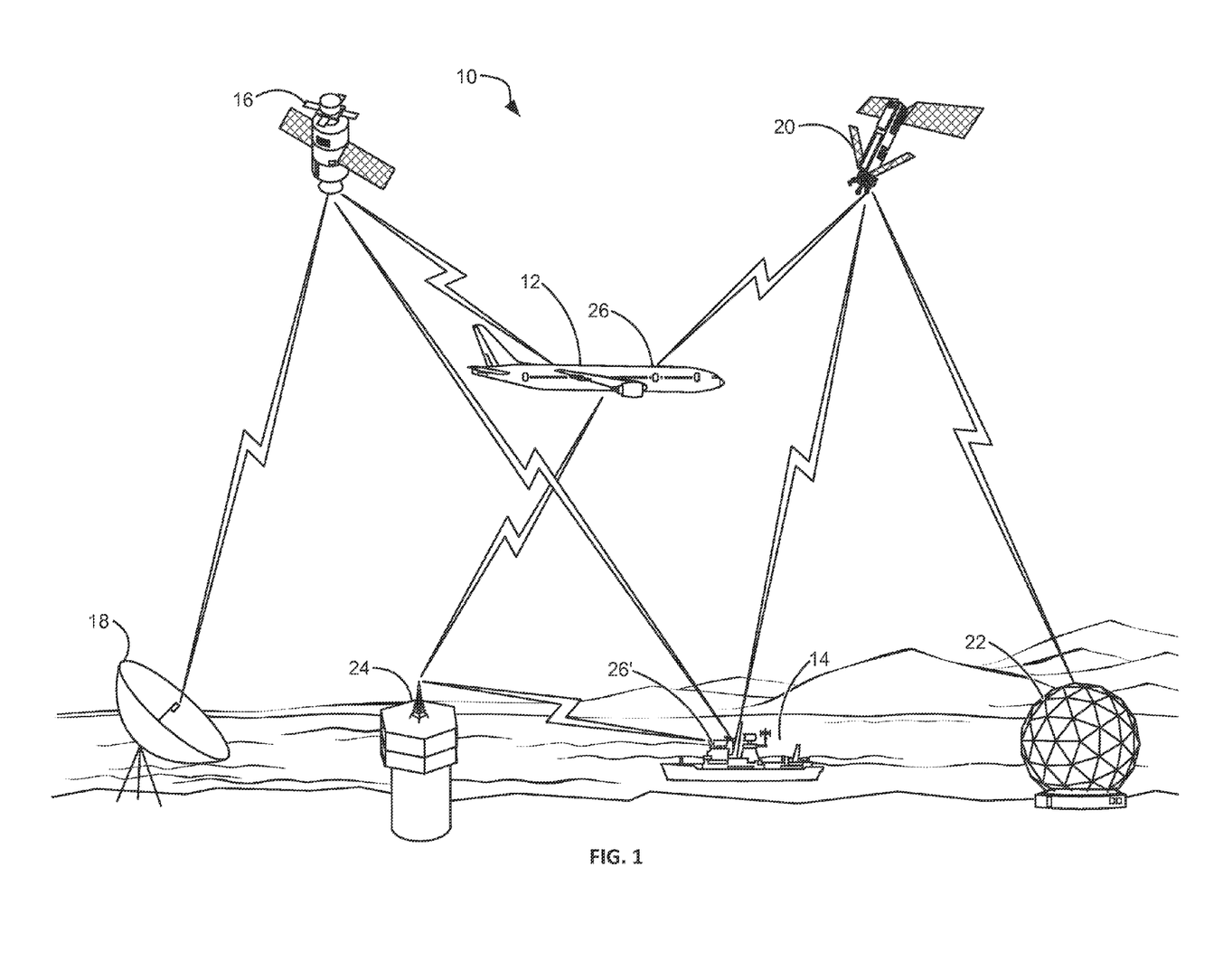
FIG. 1 is a diagram showing an aircraft and a ship in a system according to the invention.

Referring to FIG. 1, there is shown a system 10 comprising an aircraft 12 and alternatively a vessel 14 in an environment with at least four GPS satellites of a GPS satellite system 16, associated ground station 18, a low earth orbit (LEO) satellite 20 for satphone service and associate ground relay station 22, as well as a navigation radio station 24. The aircraft 12 and vessel 14 receive navigation signals from at least four different satellites of the GPS satellite system 16 and/or the navigation radio station 24 and by processing the signals determine location and altitude to establish position. As explained hereinafter, at least one or a plurality of the tamper-resistant transponders 26, 26' containing GPS receivers and satphone-grade transmitters and receivers in accordance with the invention collect data and provide the data to the LEO satellite 20.

Figure 2A:
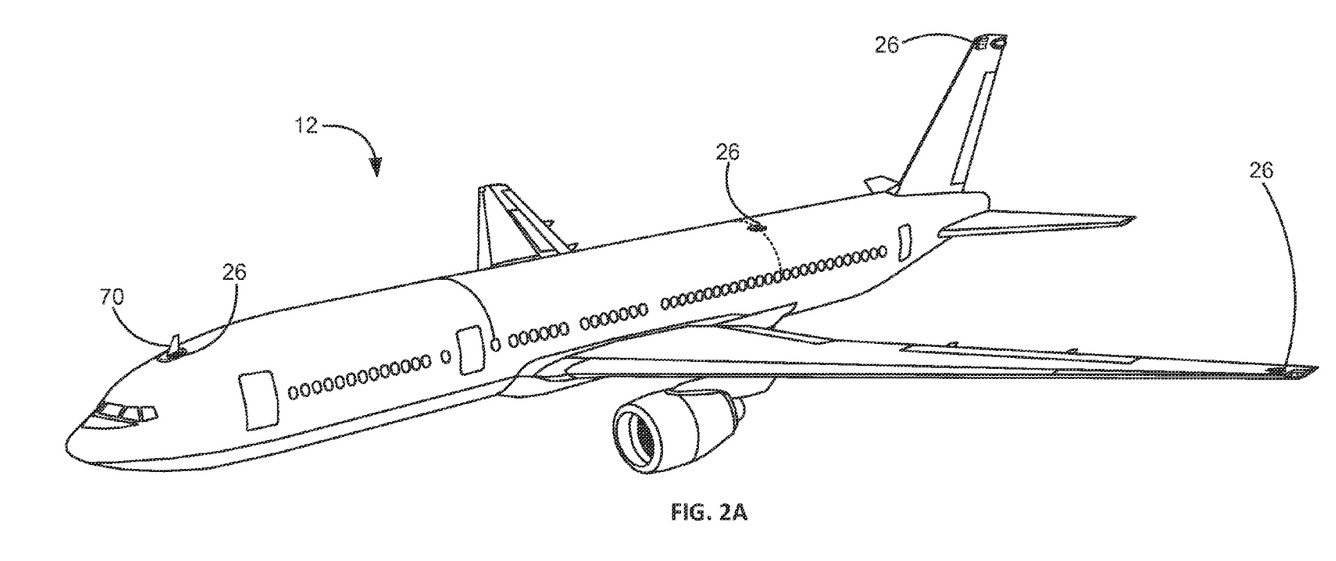
FIG. 2A is a depiction of an aircraft showing positions of deployment of a system according to the invention.
Figure 2B:
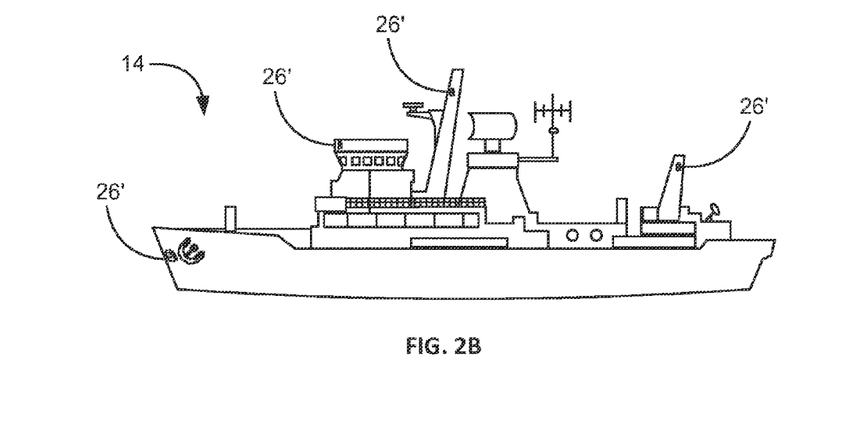
FIG. 2B is a depiction of a ship showing positions of deployment of a system according to the invention.

Referring to FIGS. 2A, and 2B for example, the transponders 26, 26' may be scattered about the craft in one or more locations that are inaccessible during aircraft or vessel operation. Satphone antennas must be clear from obstructions toward the sky. Specifically GPS antennas associated with the transponders 26, 26's must have a clear unobstructed view of the sky for a cone at their location which has 15 degrees angle from the horizon. So its apex angle from the earth surface normal is 90−15=75 degrees. This is necessary in order to assure that the transponder can have a direct view of four satellites at all times to get location and altitude. The GPS satellite constellation is configured such that there is minimum of four visible GPS satellites at all times. Most of the time there are eight GPS satellites visible for elevation angles of 15 degrees above the horizon. (If the antenna elevation mask is reduced to 10 degrees, occasionally ten satellites are visible, and if the elevation mask is further reduced to five degrees, occasionally 12 satellites are visible.) The greater the number of visible satellites, the greater would be the GPS location accuracy from satphone-grade GPS units.

Figure 3A:
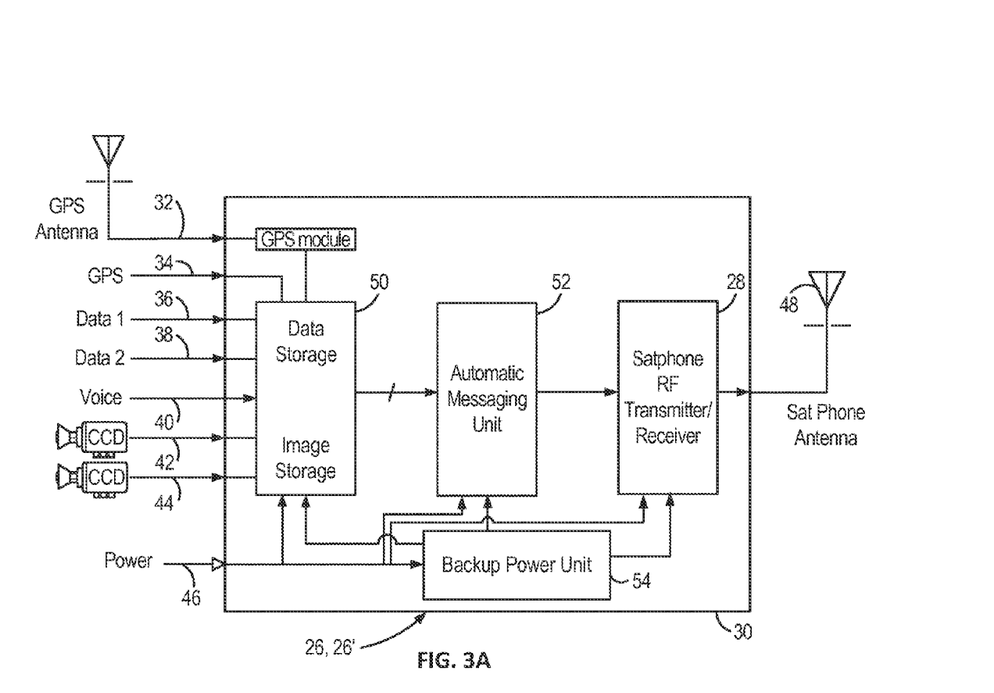
FIG. 3A is a block diagram of one transponder system according to the invention.
Figure 3B:
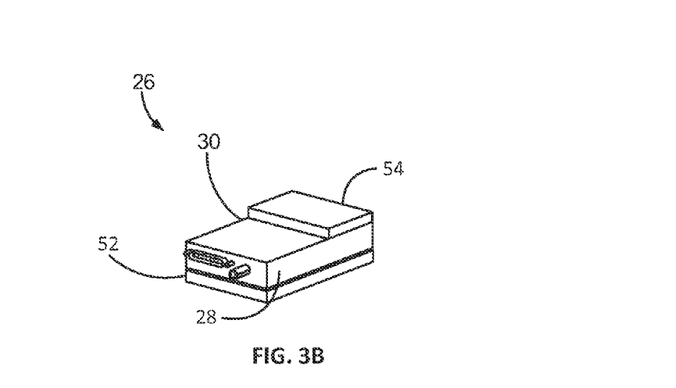
FIG. 3B is a perspective view of one transponder system according to the invention.

Referring to FIG. 3A and FIG. 3B, the largest component of such a system is an RF transmitter 28 for communicating with the LEO satellite 20 that is the system's link to a ground station 22. Even with the transmitter it still is a handheld size with small power consumption compared to any other components in the craft, whether a plane or a ship.

The transponder 26, 26' comprises a tamper-resistant enclosure 30 with data inputs 32, 34, 36, 38, 30, 42, 44, power connection 46, and an antenna system 48, internal data and information storage 50, an automatic messaging unit 52, such as an SMS messaging unit, a battery backup power supply 54 and the Satphone RF transmitter/receiver unit 28.

Each transponder 26 is modular and thus can be replaced or serviced very quickly when the craft is not in operation. They are placed in one or more several places, some being intentionally inaccessible by the crew or passengers and certainly not accessible when the craft is in operation, such as in an aircraft in flight. Such places are numerous in a ship at sea or a plane in flight. Examples of inaccessible places are shown in FIG. 2A and FIG. 2B: in the tail fin, in the upper sections of the fuselage and the wing, in a panel above the cockpit, on the outside of the hull for example near the bow, on the outside of the pilothouse, on the conning tower, on a crane or mast, all of which are accessible from the exterior only. Each will always have adequate GPS and communication satellite reception. Multiple distributed tamper resistant transponders 26, 26' have battery back-up that takes over power duties in the case of total power shutdown and can operate for an adequate amount of time, such as a month or even more.

The transponder 26, 26' may also be configured to send an automatic alert whenever central power is cut off or attempts are made to tamper with the transponder, whereupon the ground station is alerted to a problem. The cockpit or pilothouse may or may not be alerted to any such problem.

Referring in detail to FIG. 3A, there is a plurality of GPS receiver inputs 32, 34 to receive signals from GPS receivers deployed on the craft for capturing information independently from a GPS satellite system 16 and configured to determine location in near real time. It should be understood that the GPS satellite system contemplates that each GPS receiver is in communication with multiple satellites simultaneously. The automatic messaging element may be centralized in each transponder, or an automatic messaging unit may be associated with each GPS receiver and coupled to receive information on location for its associated GPS receiver. The automatic messaging unit is coupled to a transmitter/receiver operative to communicate formatted information on craft location to one or more satellite or ground stations, at least whenever polled, and preferably continuously during craft operation. The GPS modules in each "node" do not need to be a navigation grade GPS module. A suitable element is a standard (cheap) GPS module that is in smart phone units with a 20-meter accuracy, one minute of "warm up or initialization" time and one-second refresh rate after initialization. The power source 46 may include a tamper-resistant parallel power element operative to power each GPS receiver and each automatic messaging element without interruption whenever the craft is in motion. In simplest form, each transponder comprises a GPS receiver, a messaging unit and a transmitter/receiver that together constitute an independently operable transponder.

Other features of the invention are noteworthy. The formatted information is arranged for communication in digital communication packets. This is a well-understood mechanism for reliable communication of information. The formatted information can be encrypted for security. Typically the formatted information conforms to aircraft transponder response format. To promote security and inhibit tampering while in operation, at least one transponder is deployed in a position accessible only from the exterior of the craft. This may include a tail fin, an upper section of the fuselage or even in one of the wings, including a wing tip.

To further enhance security, the system may be configured so that the messaging unit generates an automatic alert transmission if any part of the system, such as just one of the transponders, is rendered inoperative. That way, the tampering with the system even when the craft is not in operation is inhibited, since there is always an external monitoring capability. Of course, there must be a protocol provided to alert the ground station of maintenance and ground service operations so that unnecessary follow-up can be avoided. Failure to follow the protocol might be a red flag that the craft is being tampered with when not in operation. One such protocol might be an encrypted message giving the count of the number of transponders in current operational status in the aircraft, which can be used as a check against the number of different transponder signals being monitored from the craft. This protocol could be employed both during operation and during non-operation of the craft.

The transponders do not need to be as rugged as the conventional flight recorder, since they only need to function while the plane is operational, assuming that the receiving station can track, record and recover location information. The cost of each transponder is not more than US$1,500, which could make it one of the cheapest navigation components in a plane or a ship.

Realization of the Tamper Proof Transponder Nodes

The conventional RF satellite communication links are heavy, expensive, relatively large and consume a large amount of power. They typically have a parabolic antenna or a flat array which is locked to a specific communication satellite, so they must be steered based on the GPS coordinates of the plane to communicate with communication satellites in geosynchronous orbit of the earth, which are at an altitude of 42,164 km (26,199 miles) from the center of the earth.

Communication is typically in the Ku and Ka bands. As an example, the ViaSat 2540/2532, which is in service in many commercial planes, operates in the Ka band with 2.5 Mbit/sec to 20 Mbit/sec and 70 Mbit/sec to 100 Mbit/sec communication data rates for from and to the aircraft respectively. The transmit frequency is 28.1 GHz to 30 GHz and its receive frequency is 18.3 GHz to 20.2 GHz. Some other manufacturers also have suitable models on the market, for example receiving (Down Link) at 10.95 GHz to 2.7 GHz and transmitting (Up Link) at 14.0 GHz to 14.5 GHz. The need for long-distance communication with satellites at the geosynchronous orbit is the main reason for their high power consumption, which is on the order of 40 watts to 100 watts. They can provide high data rate transmission, sufficient for live video, which is not needed for this application. Total weight is on the order of 40 kg (88 lb). Due to their size, weight, power consumption, price, and the mechanical complexity of their tracking antennas, using such equipment as distributed tamper-proof transponder nodes in a plane is not practical. Another drawback is they might be turned off by a hijacker simply by turning off a switch.

On the other hand, distributed tamper-proof transponder nodes according to the invention can potentially be built and be operational in any commercial aircraft with off-the-shelf components and be deployed very quickly using mobile satellite phone technology. For example, the Iridium system of low-earth orbiting satellites employs cellular phone-like transceivers that are available in single quantities for US$1,000-US$1,500. These phones are available in single quantities for US$1,000-US$1,500 on the open market. The Iridium concept is described by U.S. Pat. Nos. 5,410,728 and 5,604,920 and subsequent patents in the USA and elsewhere, primarily in the name of Motorola/Freescale. The system consists of a constellation of 66 low orbiting satellites. (The name Iridium s derived from the element iridium, which has the atomic number 66, corresponding to 66 orbiting electrons around its nucleus as in the Bohr atomic model.) The Iridium satellites are at a low earth orbit (LEO), at approximately 781 km (485 miles) with inclination angle of 86.4°. Their low earth orbit is the main reason the Iridium phones can operate with very low power consumption compared to the other RF satellite links. They are also very small and as light as 266 grams (9.4 ounces) with total power consumption of 0.57 Watts. Moreover, they can send text messages, and they have their own built in GPS receiver. Since the transponders, satellite RF links and the ACARS systems used in aircraft use different communication protocols than the Iridium phones, the Iridium system provides an additional level of reliability to the communication system during an emergency. They operate in the 1618.85 MHz to 1626.5 MHz band and can operate continuously for 3.5 hours with their own standard Lithium Ion batteries. They can also transmit data at a rate of 9600 kbit/sec, send and receive text messages and are not larger than any smart phone in size. They are built much more ruggedly than consumer-grade cell phones and comply with military specifications. They are manufactured by several companies, and a wide variety of services are available. They are also available in modules that they can be built so as to meet additional capabilities that may be required for installation and use.

The typical cost of transmitting a text message using any satellite service provider is on the order of $0.37/message. If the intent is to transmit a text message each and every minute containing the flight information, GPS coordinates, speed, heading and altitude, the cost would be less than $30 per flight-hour per node. As can be seen, the operating cost is minimal compared to any other system in an aircraft or sea-going vessel. One-minute intervals of text messaging would give a central tracking system flight information related to the flight with a maximum of 16 km (10 miles) distance between transmission locations, assuming the craft is flying at 600 mph (965 km/hr).

Tracking Software

In 2012 OEA International, Inc. released two smart phone application products called AthanTimer and SolarTimer which both have tracking capabilities and emergency SMS text capabilities. The tracking capability in these programs can operate over a wide speed spectrum. They are designed from 0 mph to 1,500 mph using an algorithm that does not overcrowd the data stored for weeks of travel with any speed and altitude profile. The algorithm is based on storing location and altitude data if the differences between the adjacent location coordinates are larger than a calculated distance $\Delta d$, based on the speed of the travel. For speed below 100 km/h, $\Delta d$ is set to 50 meters and is adjusted by the speed. There are now independent products doing only tracking functions, namely GPSTrackingM and GPSTakipM. This capability is in almost 24 smart phone products released by OEA International, Inc. since 2012. These products show altitude, speed and location information that is stored in a file. A user can email the tracking data to other smart phones or tablets. The OEA International, Inc. smart phone and tablet application products having SMS emergency text and tracking capabilities have been sold in 214 countries since their introduction in 2012. If smart phones or tablets have these application programs, they can load the tracking data and superimpose it over a map and can do many other navigation functions with it. A user can go to each data location and the software display will pop up the GPS coordinates, speed, altitude date and time information on the screen. Plots related altitude and speed as a function of time may also be displayed as an option.

The tracking and display functions of the software at the receiving end are basically a modification of these application programs on a computer with large data storing capabilities coupled to a large HDTV screen for ease of view at an airline tracking center.

There are two issues associated with a cell-phone-type tracking system that this invention eliminates. Normally, to track location and altitude, there is a need for good GPS signal reception from four different GPS satellites. When a smart phone is in a metal-skinned aircraft with a passenger, reception of 1.575 GHz GPS signals becomes a problem. This is illustrated by solving the Helmholtz Wave equation, which is derived from Maxwell's equation, as applied to a metal enclosure. The skin depth for a good conductor such as aluminum for a plane wave can be calculated by:

$$\delta = \sqrt{\frac{2}{\omega \sigma \mu}} = \sqrt{\frac{1}{f \pi \sigma \mu}} = \sqrt{\frac{\rho}{f \pi \mu}} \qquad (1)$$

where $\omega$, $\sigma$, $\mu$, $\pi$ and $f$ are angular frequency in radian/sec, conductivity, magnetic permeability, electrical resistivity and frequency in Hertz respectively. On the other hand $\mu$ in (1) is:

$$\mu = \mu_0 \cdot \mu_r \qquad (2)$$

where $$\mu_{rAl} = 1$$

and $$\mu_0 = 4\pi * 10^{-7} = 1.2566 * 10^{-7} \left[\frac{\text{Henry}}{m}\right]$$

Using (1) and (2), the skin depth for blocking a signal at 1.575 GHz of GPS signals will give 2.09653 microns (0.00209653 mm). Technically this would prevent reception at this frequency in an aircraft. However, if the passenger is seated near or next to a window, it can be shown that for the most of the time during a flight, the communication system of a GPS works adequately, and tracking data is available for many different flights between different airports and dates.

The second issue is related to the transmission of the tracking data. Since it is based on cell phone technology, it first must be close to a cell tower and it must be at a good location in the aircraft which permits a good signal level at the cell phone (3G/4G) communication frequency of 2.4 GHz. Again using (1) and (2) the skin depth at 2.4 GHz is 1.6983 microns (0.0016983 mm) and the same problem exists as for the GPS signal reception. So an important factor for good reception is that both the cell phone signals and GPS signals should enter to the plane through the nonmetallic windows of an all metal aircraft. Table [1] gives the skin depth for aluminum and the wavelengths in free space for related frequencies relevant for this invention. The wavelength data provided in Table [1] gives an idea of the antenna size required for a good reception at those frequencies, and it also shows that at a wavelength less than the window size in a plane the electromagnetic radiation is allowed into the plane through its windows at the frequencies of interest. The wavelengths in Table [1] are calculated by, $$\lambda = \frac{c}{f} \quad (3)$$

where c is speed of propagation of the electromagnetic wave, taken as speed of light in free space. As can be seen the most important factor that would make this system nonfunctional is the distance of the plane to ground-based cell the towers, which is mostly larger than the range of any cell phone range of communication. Thus an alternative cell service is preferred.

TABLE [1]

| | Frequency (GHz) | δ (microns) | Wavelength (cm) |
|---|---|---|---|
| GPS | 1.575 | 2.0967 | 19.0344 |
| Iridium | 1.6186 | 2.0681 | 18.5222 |
| 3G/4G | 2.4 | 1.6983 | 12.4913 |

$$\delta = \sqrt{\frac{2}{\omega\sigma\mu}} = \sqrt{\frac{1}{f\pi\sigma\mu}} = \sqrt{\frac{\rho}{f\pi\mu}}$$

$$\mu = \mu_0 \cdot \mu_r$$

where $$\mu_{rAl} = 1$$

and $$\mu_0 = 4\pi * 10^{-7} = 1.2566 * 10^{-7} \left[\frac{\text{Henry}}{m}\right]$$

The Iridium satellite phone system eliminates this problem, and as long as the satellite phone has its antenna unobstructed and pointing upwards towards the sky at the normal direction to the surface of the earth, the system will have 100% coverage in the globe, from the South Pole to the North Pole all the time.

There are various ways to deploy transponders according to the invention. The guiding principal is that the transponder must be easily serviceable but inaccessible to crew and passengers during craft operation and that the transponder be able to transmit a signal with enough power to be heard. Possible locations include deployment at shallow locations in the upper surfaces of the plane and at suitable places for installing the external antenna, with close proximity of power line and data buses for powering the transponders and for their data communication among them and the navigational computer. The data communication can be optical fiber or any type of data bus that is used in the plane. Even wireless communication can be established, specifically spread spectrum low power alternatives.

If the external antenna is of the type used in satellite phones, with no modification, it must be housed in an aerodynamic radome-like fin (70, FIG. 2A) that is shaped like low drag structures already in use by the aircraft. They can even share radomes already in the upper fuselage. Another approach is to use "patch" or "transmission line" antennas that can be placed on the upper surface of the aircraft. These types of antennas are thin, low profile antennas that do not create any aerodynamic problems such as drag and they also have high antenna gain in the general direction normal to the plane of the antenna. There are many examples in use for such antennas.

Another approach is to cut a small window in the metal skin of the aircraft and then placing a small glass-like insert in the opening, then placing a "patch" or "transmission line" antenna right under the patch. This is not a generally favored option because this type of structural modifications can only be done by the aircraft manufacturer.

Placing the electronics in the pressurized areas and just having the antenna at the skin will bring the specification for the electronics down to a much manageable level as well. One option is a fireproof chamber where transponder electronics are placed. This type of arrangement will not have any negative impact on the safety of the aircraft. Nevertheless such modifications have to be approved by aircraft regulatory agencies such as the FAA. So modifications should comply with regulatory guidelines and safety rules The Transmitted Text Message The transponder generates an automatic text message that must be transmitted. The transmitted text message through the satellite phones contains these vital information regarding to the safety of the aircraft:

i. GPS coordinates obtained by the satellite phone, latitude and longitude,
    ii. Date and time,
    iii. Flight related information like the flight number,
    iv. Altitude,
    v. Speed and bearing (These can also be calculated or verified at the receiver end using (i) and (ii),
    vi. ACARS and Transponder status (On/Off),
    vii. Satellite phone battery level and power status at the hook-up,
    viii. GPS coordinates and altitude from the cockpit navigation system, In addition to text, image information may also be sent along that will give valuable information related to the emergency situation. As an example, each node can have inputs 42, 44 (FIG. 3A) to be connected to one or more simple CCD cameras, such as found in cell phones. Before every text, one or more pictures could be sent. If the situation corresponds to an emergency situation the image could be sent along with the text or whenever requested by the ground control.

A CCD camera or cameras in the cockpit and automatic transmission to the ground control center can give very valuable information in a hi-jacking situation. If the situation is an emergency situation, the camera and the microphone may be automatically turned on and used to establish a "live" voice channel between the cockpit and ground control by initiating a phone call to the ground control. The same can be established whenever the ground control would like to establish a voice communication with the cockpit outside of conventional radio if they believe there is a suspicious situation in the flight. This communication between the cockpit and the ground control could be made through a safety protocol, so that a pilot would not need to take any suspicious actions. He would simply know that the ground control is on the line and listening and can give relevant "hidden" information related to the situation without alerting the hijackers.

The camera images from the passenger compartment that are handled by other nodes will also give additional very useful information related to the general emergency situation to ground control. Similarly the flight attendants can initiate a call from the designated locations along with images attached to it. Each node may be connected to the cockpit navigational computer through data lines to monitor operation. To provide additional safety for receiving the text messages, the generated text messages can be sent not only to a single phone number associated with a single airline monitoring and control center, it can be configured such that they can be sent to multiple locations. This feature has already implemented as a "list of emergency contact numbers" in the implementation of the invention described in co-pending U.S. patent application Ser. No. 13/705,708, filed Dec. 5, 2012 and incorporated herein by reference for all purposes.

Operation

The nodes will turn on automatically when the aircraft is operational by detecting the electrical power. Their operational status will be relayed to the cockpit and the airline command center with an initialization SMS message from the automatic messaging units 52 and then the transponder goes into a wait mode. The messaging is through the independently operative LEO satellite.

The pilot, the airline command center and control tower will be informed of the readiness of all "nodes" in the plane.

The pilot will initiate the SMS activity before takeoff, and the control tower as well as the airline command center will acknowledge and see its "operational" SMS text.

Once the "nodes" start broadcasting they cannot be turned off by any means by the pilot! This is a key lesson learned from prior disasters. Turning off requires the following protocol.

i) The plane has to be stationary. This condition will be determined by the GPS data at the nodes themselves, not the GPS data coming from the cockpit navigational computer.

ii) The nodes will wait for an electrical signal after the plane is stationary for a preprogrammed time, such as one hour. This signal can be generated when the plane is at docking position, externally and after the pilot sends an authorization signal from the cockpit indicating that the external turn off signal is valid! This external signal could be also generated by the doors, if it is open it is an indication of docking while node-determined GPS speed is zero and the door status is reported as valid from the cockpit.

iii) Additional safety can be added by a "termination" SMS message and awaiting its reply from the airline control center. Thus the "nodes" will report that there is an external signal indicating it is at docking position and it is validated by the cockpit and waiting for an SMS "acknowledge" reply from the airline control center. Once validity of this is also verified, the "nodes" will shut off one at a time with a predetermined delay.

Some pilots feel that they must be in control of everything in the aircraft and might be unhappy with the restrictions implied by this protocol. There may at first seem to be valid reasons, such as a fire, but they are NOT for following reasons, i) The "nodes" are placed in fire proof containment chambers, so if they are burning the fire will not spread.

ii) If the pilot feels that the wires feeding the electrical power to the "nodes" are on fire and are causing a danger for the flight, that is an impossibility because the "nodes" do not need more than 800 mA at 6V power. They are protected by fuses at both ends. The low voltage and current requirement of the "nodes" can never cause a fire and if there is a fire at the "nodes" it is in a fireproof chamber and cannot spread anywhere. If the pilot still feels it is necessary to shut down the power, that can be done, but the battery back-up of the "nodes" will keep on working and transmitting SMS texts until their battery back-up power is exhausted.

As can be seen, without parking that is confirmed by an external switch and its prior authorization of the validity of it by the pilot the "nodes" cannot be turned off!

The invention has been explained with reference to specific embodiments. Other embodiments will be evident to those of skill in the art. It is therefore not intended that this invention be limited, except as indicated by the appended claims.

The invention claimed is:

1. A system comprising:
a plurality of GPS receivers deployed on a craft for capturing information independently from a GPS satellite system and configured to determine location in near real time;
an automatic messaging element associated with each GPS receiver and coupled to receive information on location for its associated GPS receiver, the automatic messaging element including a transmitter operative to communicate formatted information on craft location during aircraft operation; and
a power source including at least a tamper-resistant parallel power element operative to power each GPS receiver and each automatic messaging element without interruption whenever the craft is in motion;
the GPS receivers and the automatic messaging elements being deployed at a plurality of positions in the craft as a transponder system, the positions being inaccessible during craft operation;
in order to provide near real-time information on craft location while inhibiting disablement of the system.

2. The system of claim 1 wherein the formatted information is arranged for communication in digital communication packets.

3. The system of claim 2 wherein the formatted information is encrypted for security.

4. The system according to claim 2 wherein the formatted information conforms to aircraft transponder response format.

5. The system according to claim 1 wherein the transmitter is configured to communicate with a low earth orbit satellite communication system.

6. The system according to claim 1 wherein at least one GPS receiver and each automatic messaging element are deployed in a position accessible only from the exterior of the craft.

7. The system according to claim 6 wherein at least one GPS receiver and each automatic messaging element are deployed in one of a tail fin, an upper section of a fuselage, a wing and a landing gear compartment.

8. The system according to claim 1 wherein the messaging element is configured to generate an automatic alert transmission if any part of the system is rendered inoperative.

9. The system according to claim 8 wherein the automatic alert is an encrypted message including a current count of the number of active transmitters so that a monitoring station can check the current count against the number of active transmissions.

* * * * *